United States Patent
Gessner et al.

(10) Patent No.: US 6,343,377 B1
(45) Date of Patent: *Jan. 29, 2002

(54) SYSTEM AND METHOD FOR RENDERING CONTENT RECEIVED VIA THE INTERNET AND WORLD WIDE WEB VIA DELEGATION OF RENDERING PROCESSES

(75) Inventors: Rick Gessner; Peter S. Linss, both of San Diego; Kipp E. B. Hickman, Los Altos; Troy Chevalier, San Carlos, all of CA (US)

(73) Assignee: Netscape Communications Corp., Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/000,520

(22) Filed: Dec. 30, 1997

(51) Int. Cl.⁷ .................................................. G06F 9/45
(52) U.S. Cl. ........................................ 717/10; 707/513
(58) Field of Search ......................... 395/712; 707/1, 707/513; 345/333, 346; 709/200, 217, 232; 717/11

(56) References Cited

U.S. PATENT DOCUMENTS

| | | | | |
|---|---|---|---|---|
| 5,377,259 A | * | 12/1994 | Butler et al. | 379/93.25 |
| 5,421,009 A | * | 5/1995 | Platt | 709/221 |
| 5,659,735 A | * | 8/1997 | Parrish et al. | 707/10 |
| 5,778,368 A | * | 7/1998 | Hogan et al. | 707/10 |
| 5,907,843 A | * | 5/1999 | Cleron et al. | 707/10 |
| 5,913,040 A | * | 6/1999 | Rakavy et al. | 709/232 |
| 5,919,247 A | * | 7/1999 | Van Hoff et al. | 709/217 |
| 5,923,885 A | * | 7/1999 | Johnson et al. | 717/11 |
| 5,940,074 A | * | 8/1999 | Britt, Jr. et al. | 345/749 |
| 5,964,830 A | * | 10/1999 | Durett | 709/200 |

OTHER PUBLICATIONS

Brown, Using Netscape 3.0, QUE, pp. 21, 23, 90, 111, 656, 664, Jun. 1996.*
Sun Microsystems, The HotJava World–Wide Web Browser, http://java.sun.com/docs/white/,Hotjava.doc1.html, Oct. 1999.*
Chamberland–Ryman, IBM VisualAge for Java, IBM Systems Journal, Armonk, Jul. 1997.*
Lindsey–Hoffman, Bridging Traditional and Object Technologies: Creating Transitional Applications, IBM Systems Journal, Armonk, Jul. 1997.*
Quinnell, Java Perks Up Embedded Systems, EDN, Boston, Aug. 1997.*
Grehan, Inprise's JBuilder–Take 2, Byte, Peterborough, Jul. 1998.*
"InLine Plug–Ins" retrieved via the Internet and World–Wide–Web at http://home.netscape.com/comprod/pr . . . ator/version_2.0/plugins/index.html, Dec. 25, 1997 at 10:23 pm.
"Chapter 1 Plug–in Basics" retrieved via the Internet and World–Wide–Web at http://developer.netscape.com/libra . . . ation/communicator/plugin/basic.htm, Dec. 25, 1997 at 10:34 pm.

* cited by examiner

Primary Examiner—Mark R. Powell
Assistant Examiner—Hoang-Vu Anthony Nguyen-Ba
(74) Attorney, Agent, or Firm—Erik B. Cherdak & Associates, LLC

(57) ABSTRACT

A system and method for manifesting content received via the Internet by an automatic data processing system includes and involves a content retrieval module for retrieving content from the Internet. The content is arranged to be manifested by the automatic data processing system. Also included and involved is a content manifestation module that is coupled to the content retrieval module. The content manifestation module is operable to receive a replaceable software delegate during its operation, and to manifest the content within the automatic data processing system in accordance with the replaceable software delegate. The replaceable software delegate controls the manifestation of the content by the content manifestation module.

35 Claims, 8 Drawing Sheets

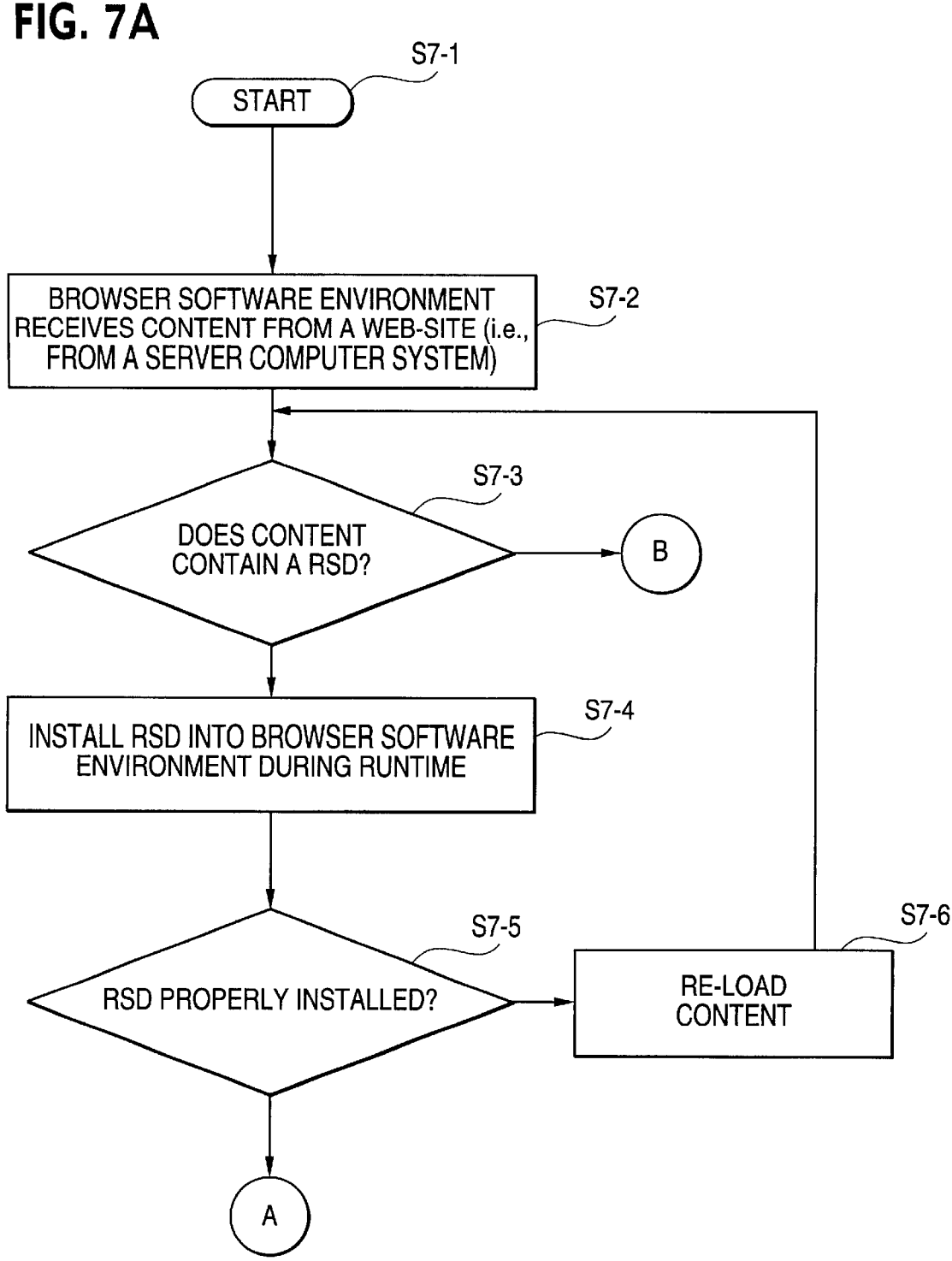

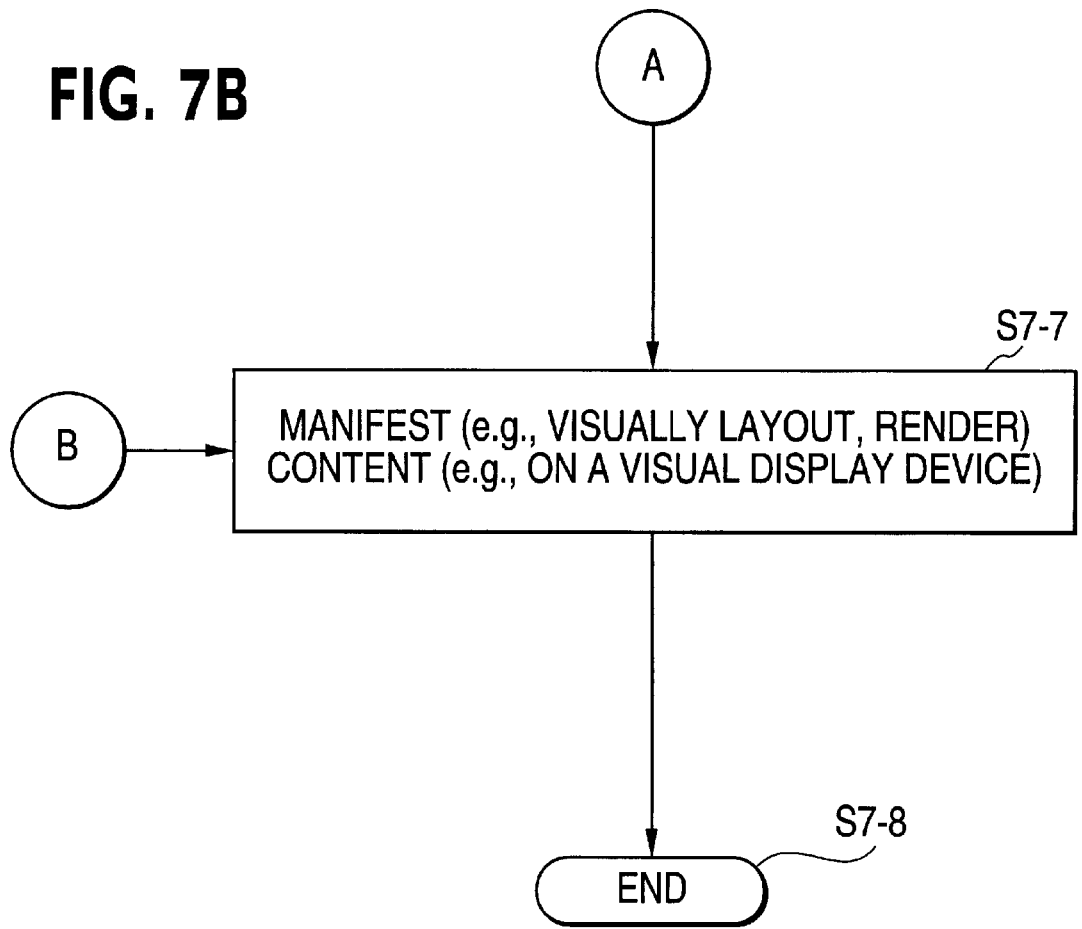

SYSTEM AND METHOD FOR RENDERING CONTENT RECEIVED VIA THE INTERNET AND WORLD WIDE WEB VIA DELEGATION OF RENDERING PROCESSES

BACKGROUND OF THE INVENTION

1. Field of the Invention

The present invention relates to content layout techniques and systems which are used to render content received via the Internet and world wide web.

2. Description of the Related Art

As a result of the wide acceptance and use of the Internet, world wide web (WWW), intranets, and open-standards technologies (Internet protocol technologies), computer enthusiasts and business users (collectively, "users") have become dependent on the same to receive information and content related to particular points of interest. For example, many users now rely on the WWW to conduct routine tasks such as performing research about a particular topic, retrieving content related to particular events, and engaging in commerce with merchants who operate electronic storefronts. In many respects, the WWW has enabled increased and efficient distribution of information and has opened whole new markets. The growth and expansion of the WWW has created a corresponding and ever-changing expanse of content that may be retrieved and processed by users.

To receive content via the Internet and WWW, users typically utilize what is referred to as a "web browser." Typical web browsers are configured as client programs (clients) that may be executed on a personal computing system to access network resources and, in particular, server computer systems which act as web servers, request specific content in the form of web pages, receive such content, and render or layout such content on a visual display device of the personal computing system (or on some other device depending on the nature of the content retrieved—e.g., sound content, printer output content, etc.). Widely used and well-known web browser software packages include the Netscape® Communicator™ Suite of client products (e.g., web browser, mail client, etc.) which is manufactured and marketed by NETSCAPE COMMUNICATIONS CORP., and the MicroSoft® Internet Explorer® web browser.

Many web browsers are implemented as software packages that are built based on traditional object-oriented programming techniques and based on conventional client-server paradigms. That is, many web browsers rely on core functionality and corresponding software objects to process and render content retrieved from a web server. In turn, such software objects are accessed by application program interfaces (APIs) which are pre-arranged and configured to interact with such software objects in predefined and specific ways. If content is not recognized by the built-in software objects of a particular web browser software package (which are fully defined at compile-time of such web browsers), users of the same must resort to either upgrading their software or remain unable to retrieve and view rich, current content. As such, the producers of many web browsers must constantly enhance and further enable their web browser software packages in order to keep up with the ever-increasing and changing types of content that may be retrieved, processed, and, ultimately, rendered and laid-out.

To address the aforementioned problem associated with enhancing web browser software technologies and products to allow rendering and layout of ever-changing and new types of content, various technologies have been developed.

For example, many browser software packages allow "helper applications" to be installed so that certain content may be processed accordingly. Compressed files of the "zip" format, for example, may be distributed via the Internet and retrieved by a web browser client software package. After a zip file has been retrieved, a helper application such as a zip extraction utility may be used to extract a compressed filed stored according to the zip file format. Accordingly, helper applications allow web browsers to be enhanced through the addition and automatic-program-launching of separate and distinct specialized programs. Helper applications do not allow core functionality of a web browser software package to be changed or replaced with other functionality (or software) that will process and manifest content in a different way.

Another technology that has been widely used to enhance the functionality of web browser software packages is known as "plug-in" technology. Plug-ins enhance browser software packages by adding functionality in a more tightly-coupled way than helper applications. That is, plug-ins allow content received via the Internet to be processed within a separate processing environment (e.g., a window), but within a browser session. For example, many multimedia files such as sound files may be retrieved via the Internet and played through a multimedia player application which is implemented as a browser plug-in. Unfortunately, while browser functionality is greatly enhanced through use of plug-ins, plug-ins, do not allow core browser functionality (e.g., content rendering and layout) to be replaced with software objects that can process and render content in new and different ways from those already provided by web browser software producers.

To add greater flexibility in terms of browser software enhancement, browser software producers have enabled Java language processing engines that may be used to process Java applets. Basically, Java applets are programs that may be distributed via the Internet and received within a browser environment. The applet is given a screen space in which to operate. The applet is not able to generally control the disposition, rendering and layout of content generally within a particular web browser instance. And, in many instances, because of security, Java applets are prevented from accessing files which otherwise reside on a user's computer and the like. As such, although Java applets enhance the web experience, they, like helper applications and plug-ins cannot currently be used to replace core browser functionality (e.g., margin layout, etc.) to control the layout and disposition of content within a browser environment generally.

Thus there exists a need to provide a system and method for rendering content received via the internet and world wide web in which any form of content including complex content containing instructions regarding content layout and the like may be processed without requiring a web browser software package to be capable of processing such content in advance of its receipt. To be viable such a system and method must be based on a new computer programming technique and paradigm that will allow tasks within a web layout environment to be delegated to new software objects that may become seamlessly executable during runtime execution of a web browser environment.

SUMMARY OF THE INVENTION

In view of the foregoing comments regarding the related art, the principal object of the present invention is to solve the aforementioned problems.

It is yet another object of the present invention to provide a content layout engine for rendering content received via the Internet and that is capable of being dynamically changed.

It is yet a further object of the present invention to provide a content layout engine for rendering content received via the Internet which takes advantage of task delegation techniques to accomplish core functions performed within the layout engine.

It is yet a further object of the present invention to provide a content layout engine for rendering content received via a network connection which allows replaceable software delegates (implemented in accordance with task delegation techniques) to replace program code to perform core functions with the content layout engine.

It is still another object of the present invention to provide a content layout engine for rendering content received via a network connection which is scalable and adaptable to new content standards and types.

By achieving the aforementioned and other objects, the present invention provides certain benefits to users of web browser and related computer software technologies, to developers of such technologies, and to content providers. For example, the layout engine provided by the present invention is a framework, not a monolithic layout "manager"—this benefits developers who need a rich system to manage complex geometric space, but want to extend and expand that process in novel ways. Extension is achieved by creating layout and part objects which interact with other elements inside a layout modeling scheme. Moreover, the layout engine operates independently of the underlying view system—it collaborates with delegates of a particular software system's view hierarchy to construct relationships at runtime. So long as such view delegates export data according to appropriate protocols, the actual user interface objects that are used to connect to the layout engine are irrelevant. Moreover, the layout engine is platform independent. Additionally, the layout engine is dynamic—the core framework is small and lightweight. The layout engine relies on the principal of "least complexity," which ensures that the framework dynamically expands at runtime to the degree that a particular software system requires. In other words, layout objects and processes aren't created until needed.

The present invention achieves its objects and delivers the aforementioned benefits by providing a system for manifesting content received via the Internet by an automatic data processing system. The system includes a content retrieval module for retrieving content from the Internet. The content is arranged to be manifested by the automatic data processing system. Also included is a content manifestation module that is coupled to the content retrieval module. The content manifestation module is operable to receive a replaceable software delegate during its operation, and to manifest the content within the automatic data processing system in accordance with the replaceable software delegate. The replaceable software delegate controls the manifestation of the content by the content manifestation module.

According to another aspect of the present invention, provided is a computer readable medium containing instructions for controlling a computer system. The instructions for controlling the computer system include the steps of retrieving content from the Internet. The content is arranged to be manifested by the computer system. Other steps include receiving a replaceable software delegate, manifesting the content within the computer system in accordance with the replaceable software delegate. The replaceable software delegate controls the manifestation of the content by the computer system.

According to another aspect of the present invention, provided is a method for manifesting content received via the Internet which includes the steps of retrieving content from the Internet. The content is arranged to be manifested by an automatic data processing system. Other steps include receiving a replaceable software delegate, and manifesting the content within the automatic data processing system in accordance with the replaceable software delegate. The replaceable software delegate controls the manifestation of the content by the automatic data processing system.

According to another aspect of the present invention, provided is a system for manifesting content received via the Internet which includes a content manifestation device, a data storage device, and a processor which is coupled to the content manifestation device and to the data storage device. The processor is operative to retrieve content from the Internet, to receive a replaceable software delegate, to store the replaceable software delegate in the data storage device, and to cause the content manifestation device to manifest the content in accordance with the replaceable software delegate. The replaceable software delegate controls the manifestation of the content by the processor and the content manifestation device.

According to a final aspect of the present invention, provided is a system for distributing replaceable software delegates to automatic data processing systems in network environment. The system includes a data storage device and a processor that is coupled to the data storage device. The processor is operative to distribute content to an automatic data processing system coupled to the processor via a network. The automatic data processing system is configured to manifest the content. The processor is further operative to distribute a replaceable software delegate to the automatic data processing system. The replaceable software delegate is configured to control the manifestation of the content by the automatic data processing system.

BRIEF DESCRIPTION OF THE DRAWING FIGURES

The present invention is described below with reference to the following drawing figures, of which:

FIG. 7A is a flowchart that illustrates the flow of data within the systems depicted in FIGS. 5 and 6; and FIG. 7B illustrates the conclusion of the flowchart illustrated in FIG. 7A.

DETAILED DESCRIPTION OF THE PREFERRED EMBODIMENTS

Figure 1:
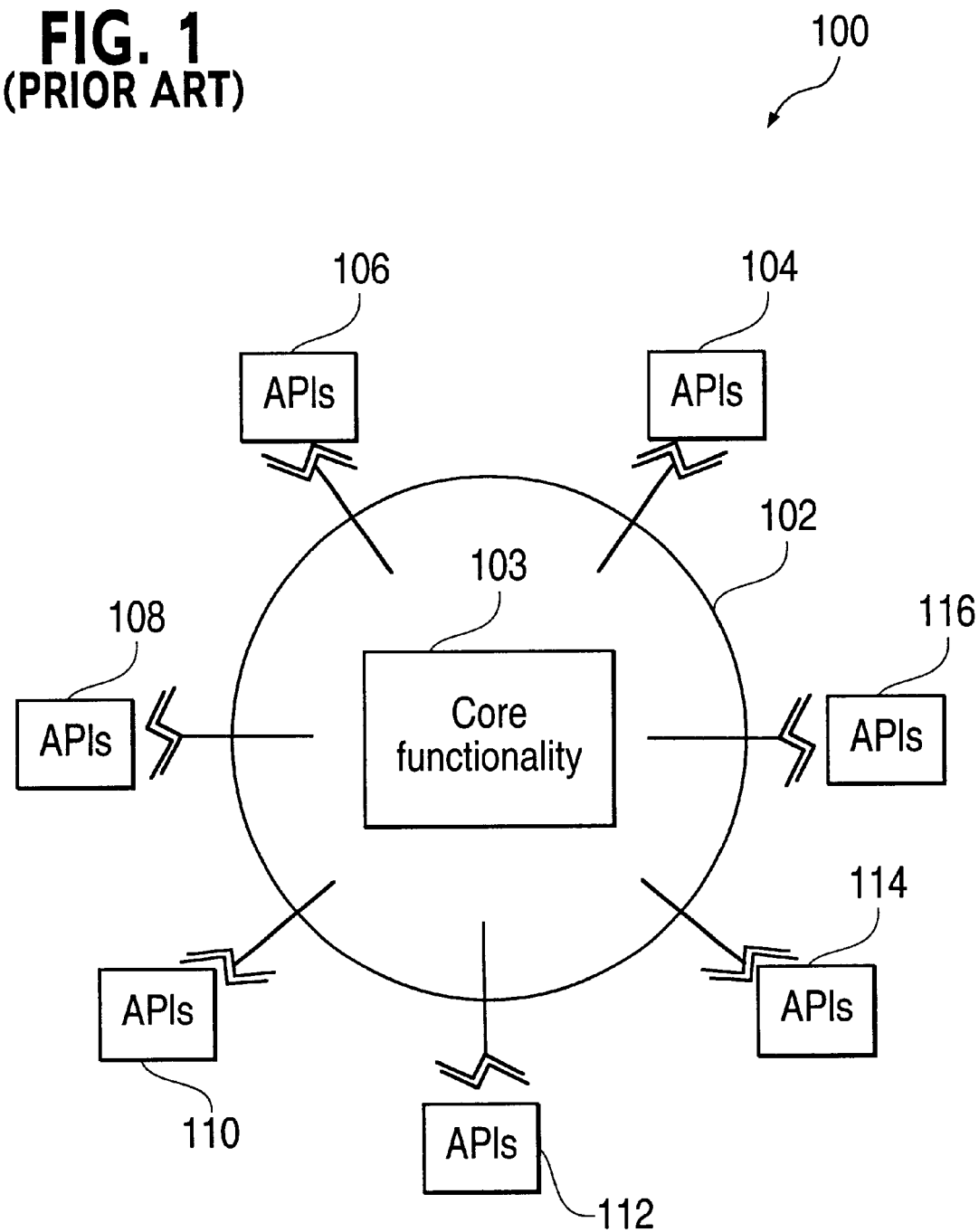
FIG. 1 is a block diagram that depicts the system architecture of a prior art web browser software package.

Below, the present invention is discussed with reference to the drawing figures that were briefly described above. The discussions that follow address definitions used herein, structural aspects of the present invention, and operational details related to the aforementioned structural aspects of the present invention. Unless otherwise specified, like parts and processes are referred to with like reference numerals.

DEFINITIONS

The following terms shall the have meanings specified below:

The terms "Internet" and "network" mean a collection of client and server computers that are coupled together to allow for the exchange of data and information among individual computing systems in accordance with a communications protocol (e.g., an IP based network such as the Internet, etc.). A private company's network of computing systems or intranet is to be considered a network in the present context. A particular computing system may be coupled to a network via any medium such as by a wired Ethernet connection, a wireless connection, a dial-up connection via a telecommunications link, etc. The physical and logical traits of a particular network and/or network connection are not to be considered as limiting factors in the implementation of the present invention.

The term "web" refers to a network wherein computers and systems are configured to communicate web documents based on a specified protocol. For example, the World Wide Web (WWW) is a web wherein hyper-text documents may be distributed according to the hyper-text transfer protocol (HTTP).

The terms "replaceable software delegate" and "delegate" refer to an executable module, code segment, macro, program, or any other implementation of an executable computer software routine that may be distributed from a server computer system to a client computer system via a network such as via the Internet and which is capable of being installed within and executed during the runtime of another computer software program such as within a web browser environment. A delegate may also be installed within another computer software program from a medium (e.g., a memory such as a disk drive, etc.) which is local to a computing system that is executing the other computer software program. A replaceable software delegate is distinguishable from a Java applet in that a replaceable software delegate is a self-contained executable module that performs a certain core task within and for a software application environment such as within a browser environment (e.g., margin layout and text rendering of web content). A Java applet, on the other hand, is program that is received by an application program like a browser that is subsequently handed off to a Java runtime system (i.e., another program) for execution—if the Java runtime system is not installed or not available, the applet cannot run and corresponding functionality cannot be achieved. If a replaceable software delegate is received within a browser environment according to the present invention, and in accordance with a defined protocol (described below), the delegate will execute to deliver its intended functionality.

The aforementioned terms are intended to clarify the present invention and not to limit the scope of the same. In the case that one of the aforementioned terms may be construed in a broader manner (such as when such a terms take on a different meaning in a particular, relevant industry—i.e., a terms becomes a term-of-art in a broader, applicable context), such a construction should prevail. In no case should a common use of any such terms override the presently useful and exemplary definitions presented above.

STRUCTURAL ASPECTS OF THE PRESENT INVENTION

To illustrate the salient features of the present invention, reference is first made to a block diagram of a system architecture of a prior art web browser client software package which is depicted in FIG. 1. In particular, software package 100 includes a set of core routines 103 which provide core functionality (e.g., data handling, input/output, content layout and rendition, etc.). Core routines 103 only are accessible through a set of predefined application programmer interfaces (APIs) 104, 106, 108, 110, 112, 114, and 116. To perform a given function within software package 100 (e.g., margin layout), a program must access a particular API (e.g., API 108) to obtain pre-arranged and fixed processing capabilities according to given static function that is defined in the core set of routines 103. As such, it will be readily appreciated that the structural model depicted in FIG. 1 works well in most cases, but for the most part, is fairly restrictive. Extensibility comes at a high price, and the system itself can easily become brittle and difficult to improve. For example, if a particular API is accessed to adjust margin layout within a web browser screen, to change the way that margins will be rendered would be impossible since access to core routines 103 is restricted. As such, a system built like software package 100 will not allow changes in core routines and, as such, will not allow for the rendition of new, yet undefined content that may be delivered to a computer system that operates software package 100.

The problems associated with extensibility and flexibility are squarely addressed by the present invention. In particular, the ability to provide, among other systems, a web browser system or environment which easily may be enhanced and modified based on replaceable software delegates is provided by the present invention.

Figure 2:
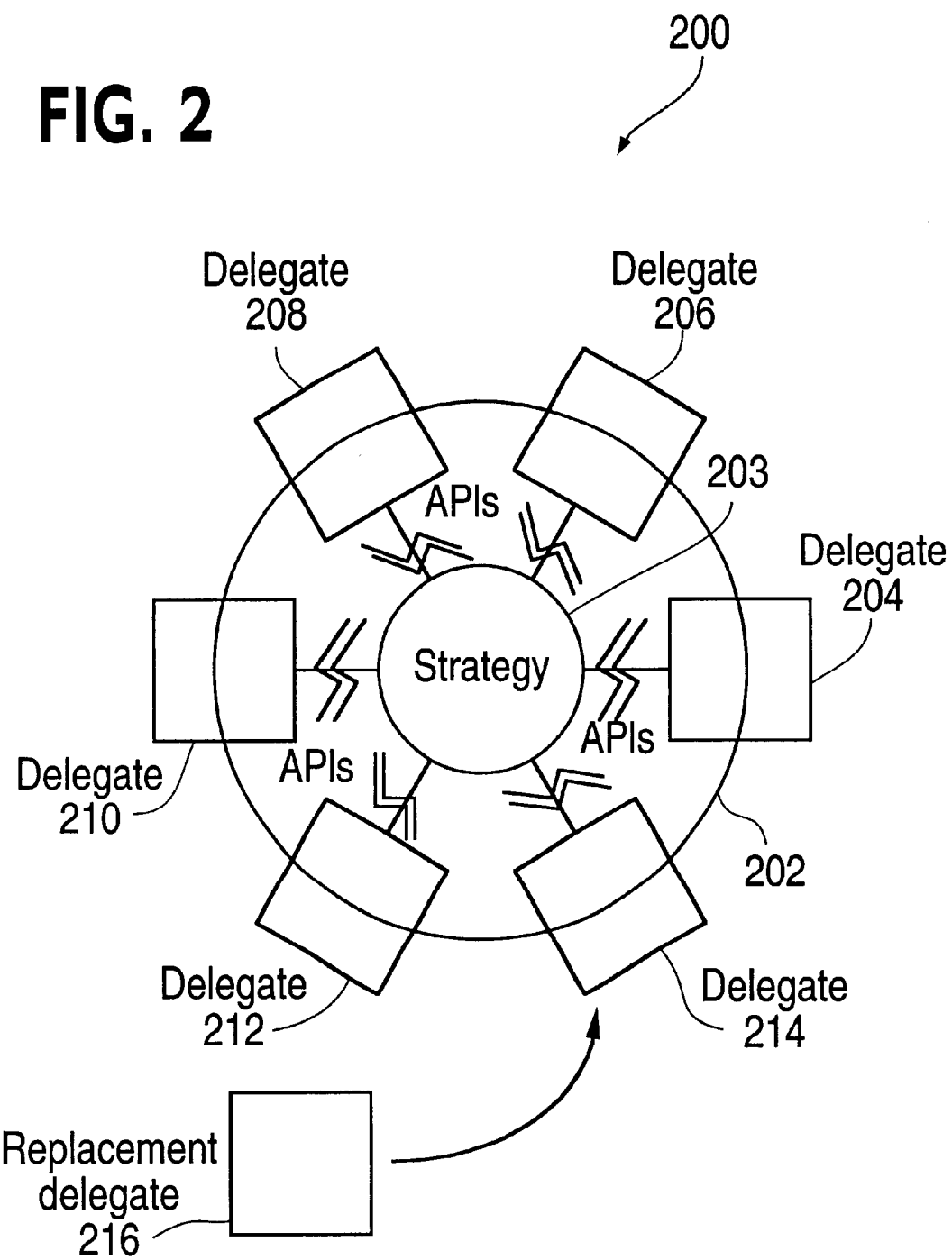
FIG. 2 is a block diagram that depicts the system architecture of a web browser software environment according to a preferred embodiment of the present invention.

In particular, referring now to FIG. 2, depicted therein is a block diagram of a system architecture of a web browser software environment according to a preferred embodiment of the present invention. In particular, software environment 200 includes a set of core routines 202 which encapsulates a strategy 203 for, among other things, content layout and rendition. Core routines 202 further includes a set of replaceable software delegates 204, 206, 208, 210, 212, 214, and 216. Accordingly, it will be readily understood that in the present invention, core functionality is pushed to the edges of software environment 200 and, in particular, to the aforementioned replaceable software delegates. This technique enables greater extensibility through delegation without the associated costs of tightly coupled systems. The framework is designed according to advanced principles of object-oriented software engineering. Fundamental to this approach are design goals of flexibility and extensibility, in addition to modularity and code-reuse. These concepts will be immediately understood by those skilled in the art.

Strategy 203 drives the process embodied by software environment 200, but it doesn't define it. Although, certain functionality may exist within strategy 203 (e.g., default web content rendering processes and objects), the present embodiment contemplates core technology that resides in the delegates around the edges of strategy 203. Significant new pieces of core technology can be subsequently plugged into the edges thereby possibly replacing pre-existing functions and objects. In essence, strategy 203 operates against the pieces of code which are the delegates which may be replaced down the road. Accordingly, it is envisioned that over time, core functionality will be drawn out from the center and from strategy 203.

In the architectural approach depicted in FIG. 1 (i.e., the classic system approach) clients get no real control over such things as content rendering and layout. They can only do the things and perform processes that their systems define for them. In software environment 200, on the other hand, content rendering and layout clients can replace the delegates. In this way, delegates such as replaceable software delegates 204, 206, 208, 210, 212, 214, and 216 can not only define new APIs, but they can drive the process from the edges of software environment 200. That is, the delegates contain the implementation for a given operation. The central strategy is the framework, which asks the delegates to do the work at the appropriate time. The way in which the work gets done is up to the delegates. The delegates, however, must honor the interfaces presented to them by the system in which they reside (e.g., by software environment 200), they must be prepared to provide information or perform certain tasks when asked by the framework, but how they do it is entirely up to them.

Also in contrast to the architectural approach depicted in FIG. 1, classic object-oriented systems define class hierarchies with common functionality implemented in base classes and succeeding levels of refinement or specialization which, in turn, are factored into subclasses. If clients want to extend the system, they must extend the class hierarchy. Typically, browser software producers don't publish their class hierarchies, so they must provide elaborate APIs to enable clients to extend the system. In software environment 200, there is no complex hierarchy to deal with, and core functionality is still provided by delegates. For example, using a class hierarchy system, if one wants to layout the margins of a document, he typically must call back up the hierarchy to find a class that does margin layout. In software environment 200, one merely calls across to a delegate that lays out margins. And, the particular delegate that is used can also be provided during runtime or one that is known within strategy 203. Furthermore, if one wants to change the way layout is performed—to extend the system, for example—in the class hierarchy system one must change the layout Glass and recompile the system. In software environment 200 one need only exchange the layout delegate (i.e., replace the same), which can be done at runtime.

Accordingly, software environment 200 can be thought of as providing a new programming approach which can be thought of as programming by discovery as opposed to programming by inheritance. Using inheritance, almost everything is known at compile time, even with object polymorphism. With polymorphism, however, more than one class can be implemented to do some particular thing and a particular class for execution can be decided at runtime. Unfortunately, however, all such classes must be known at compile. In contrast, with object delegation as provided within software environment 200, one need not have to know the particulars of any particular execution class. Moreover, one need not know what object has been implemented for a particular action or what it's called or where it exists. One can find an appropriate object dynamically at runtime and ask that object to perform the action. Accordingly, to change the behavior of the software environment 200, one need only change the composition of its objects by exchanging a delegate, which can be done while software environment 200 is running.

The architectural approach of software environment 200 confers numerous benefits. For example, one can build a web browser environment in such a way that a component that needs a task done can interrogate a central authority for a delegate to perform it. The central authority can provide an appropriate delegate based on criteria such as user preference or language, for example, so localization can be performed at runtime. Moreover, between requests for the service, the central authority can go out to a network and find a better delegate and load it into the system, so the system can even improve itself while it executes.

In the old monolithic model depicted in FIG. 1, the application knows ahead of time, at compile time, what sorts of things can be done in its environment. But in the context of the web, documents have become applications. The sorts of things the system is asked to do changes according to the web pages that are to be retrieved, loaded, and processed. So the set of behaviors the system may need to perform can change at runtime. If a component of a web page needs a particular service, it can interrogate strategy 203 and ask for an object that supports a particular interface. Accordingly, software environment 200 can support behaviors, and even interfaces, that it knows nothing about at compile time.

Figure 3:
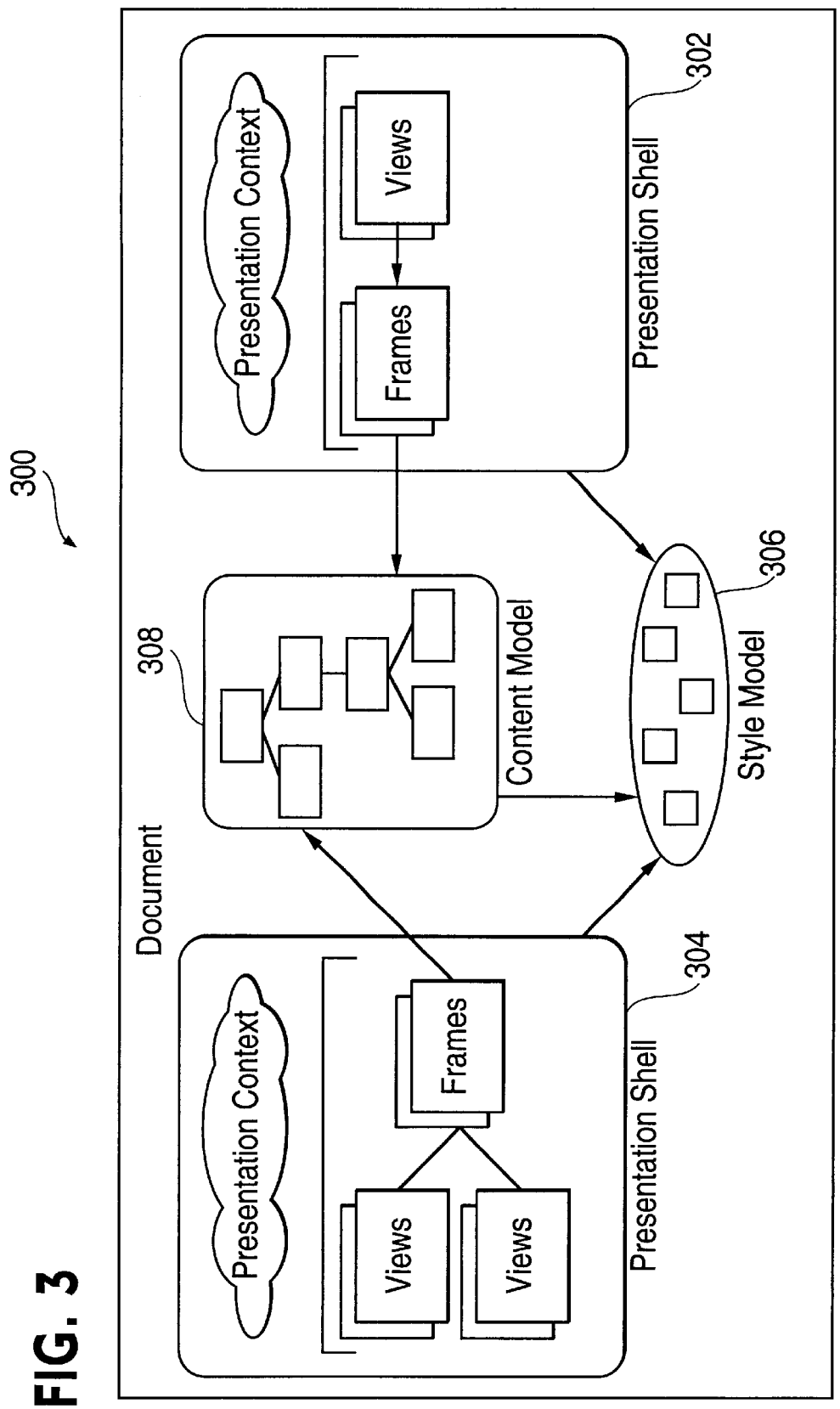
FIG. 3 is a block diagram that depicts the design of a content layout engine according to a preferred embodiment of the present invention.

To illustrate the implementation of software environment 200 to provide a web content layout framework, reference is now made to FIG. 3. In particular, FIG. 3 depicts a block of the design of a content layout engine according to a preferred embodiment of the present invention. Design 300 is presented in terms of a document that may be viewed as a result of the operations of such a layout engine. In particular, design 300 is best visualized as a collection of models and a set of processes which operate upon those models. As such, design 300 includes several models including a presentation shell model 302, a presentation shell model 304, a style model 306, and a content model 306. The interrelationships of these models will be apparent to those skilled in the art per a review of the following points.

A "model" refers to a coherent collection of objects which represent a system in a memory. As such, in the present context there are always at least four such models that exist when processing web documents. Accordingly, such models can include the content model, the style model, the frame model, and the facet or view model.

In terms of the processes that can act upon such models, it is a general rule of computer science that there are always at least as many processes as there are models. Processes are best thought of as iteration and/or transformations of a model. Accordingly, the important layout processes that can occur with regard to a model in the context of the present invention include the document construction process, the frame construction process, style management and resolution processes, the facet construction process, and rendering processes.

Based on the foregoing comments, reference is now made to an "in-memory" visualization of a document: In particular, reference is made to FIG. 4 which depicts a block diagram of a document structure during processing by the layout engine structure depicted in FIG. 3. In particular, the in-memory visualization of a document 400 which is processed by a layout engine having the design depicted in FIG. 3 will include a content model 402, an import/export view 404, a series of content cursors 406, a set of style delegates 408 (i.e., replaceable software delegates configured to handle style issues), a set of layout delegates 410 (i.e., replaceable software delegates configured to handle layout issues), a style model 412, a set of rendering delegates 414

(i.e., replaceable software delegates configured to handle rendering processes and the like), a facet model 416, a frame model 418, and a view system 420. Each of these structures is described in detail below.

Figure 4:
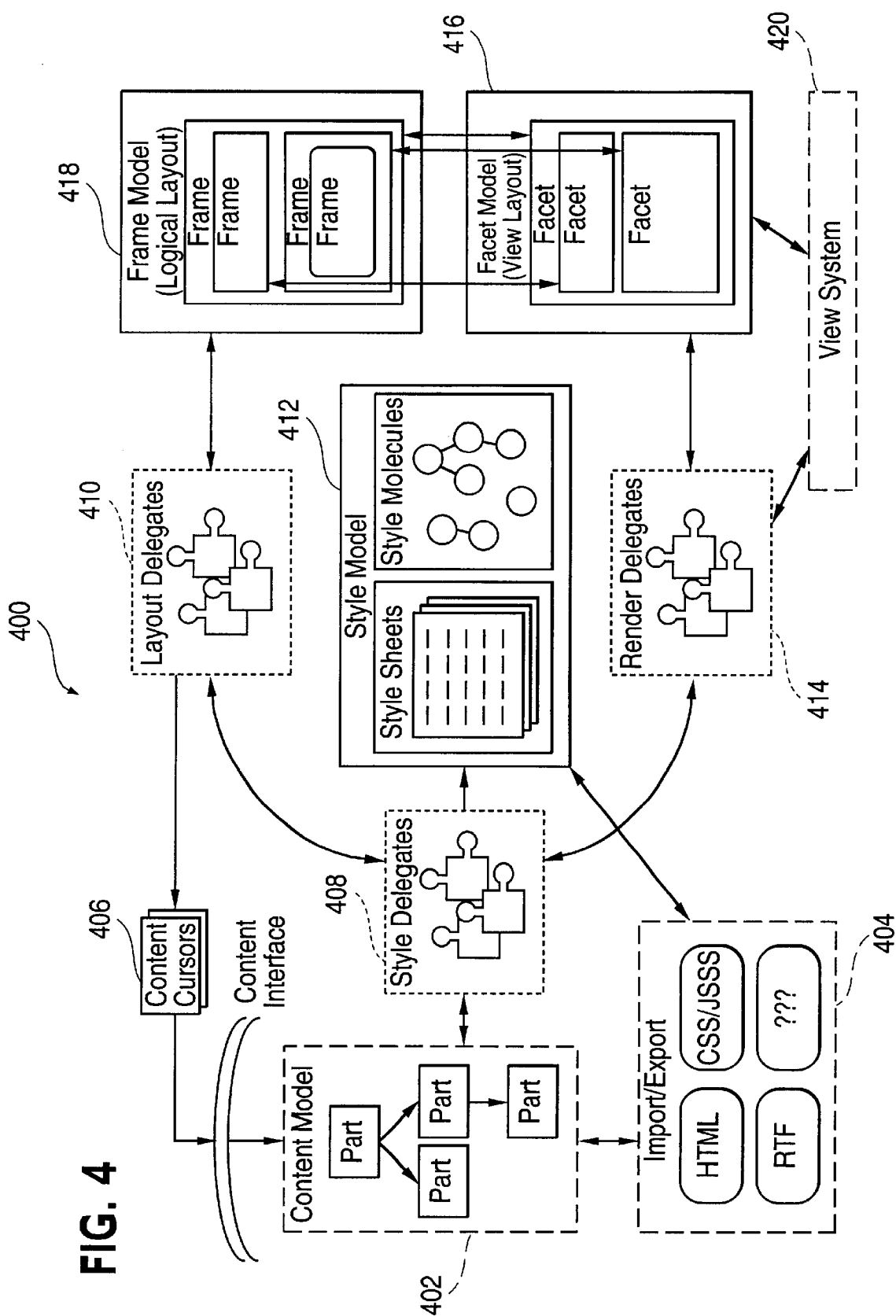
FIG. 4 is a block diagram of a document structure during processing by the layout engine structure depicted in FIG. 3.

In reviewing the structural arrangement of objects within FIG. 4, notice should be taken that some of the boxes are solid, while others are drawn with dashed lines. The solid lines represent core processes and/or models in the system, whereas dashed lines represent elements that are "plugged-in" by third parties at runtime. The core processes operate within what's called the "presentation shell", a collection of objects which describe the full context that a document is being laid out within. For the most part, these objects and process are opaque to a container application except through well defined interfaces which will be readily apparent to those skilled in the art.

In any case, because the layout engine is a compound document layout framework, it can operate on data of any type. The import/export system can be extended by third parties such that documents can contain content from an infinite set of parts.

As the diagram shows, persistent documents consumed in the import/export system are factored into a hierarchical collection of parts, also called the content model. Once again, notice that the content model frame is drawn with a dashed line, indicating that third parties can plug in their own collection of parts. In fact, this point is significant, in that there is no such thing as a proprietary part—every part is treated equally by the layout engine (though their behaviors can vary of course).

Notice that in FIG. 4, there are three dashed boxes, each containing what look like puzzle pieces. Each of these represent a kind of delegate provided to the layout engine system by a given part. Stated another way, each part "vends" a set of delegates into the layout system which operate on behalf of the part. There are three major types of delegates as shown in the diagram: layout delegates, style delegates and rendering delegates. Each type of delegate offers a different set of services on behalf of the part when asked to do so by a process within the layout framework.

The layout delegate represents the interface between any part and the layout system. The layout delegate functions to answer layout questions on behalf of the part. Since the part and its layout delegate are typically created in tandem, the layout delegate can have intrinsic knowledge of its part. This is perfectly safe since the layout engine treats all parts as opaque, operating on them only through the layout delegate which provides support for all the layout interfaces.

Like the layout delegate, the style delegate also operates on behalf of the part. The style delegate answers all the stylistic questions, such as how large a given element is, what its margin requirements are, its font choice and so on. The style delegate can optionally maintain intrinsic knowledge of the internal workings of the part it represents, but the layout engine itself will not attempt to take advantage of this knowledge.

The rendering delegate is vended by the part and serves to provide all the necessary rendering implementation. The part is therefore free to render itself any way it sees fit within the constructs of the frame model that was created on behalf of the part during the layout process.

To summarize the interaction between the delegates and the layout engine, consider the major processes. The content model is iterated (opaquely) by the engine, and a frame model is constructed as part of the layout process as defined by the interactions of the layout engine and a part layout delegate. Stylistic information is often required in the construction of the logically geometric frame model, and so the style delegate often provides the answers to stylistic questions asked on behalf of the part. Once the frame model has been constructed, the rendering process is kicked off. The layout engine iterates the newly created frame model, and asks the rendering delegate for each part within the frames to render themselves.

The last element of FIG. 4 is the content cursor. A content cursor is an interface provided by each part that enables the layout engine framework to iterate based on the underlying content.

To implement and realize the aforementioned structures illustrated in FIGS. 3 and 4, one of ordinary skill in the art ought to understand certain core abstractions that allow the present invention to achieve its results in terms of replaceable delegation of processes. For example, in the layout framework, a "document" is a an application-specific container of parts. This is not to be confused with a word processing "document" or HTML file; it could just as easily mean a "desktop" or "user interface". The application document model contains a part model, and one or more context models mapped onto one or more views.

The part model is a collection of part elements which define and delineate the individual "parts" of a document. Structurally, a part is comprised of a part-specific content model, machinations that support editing, derivative style elements, objects which know how to reflect the part into the logical-geometric frame model (for layout), and objects which support part-to-view reflection in the facet model (for rendering). Parts themselves are comprised of "content", whose composition and resolution are chosen by the part. Content is ultimately comprised of either nested pieces or content-atoms. A content-atom is the smallest form of content produced by a part. Content atoms can be said to comprised of text, images, vectors and other concrete data types.

The presentation shell within the layout engine is an abstraction for a logical or physical device. Examples include graphic monitors, printers, videotape recorders, 3D worlds, and so on. Allowing the document model to know abstractly about context is important, because contextual issues can influence how the document gets laid out. For example, think about the page-size differences on a portrait versus a landscape device—or the contextual difference between display a document and printing it. Contextual issues are device dependent, and can include the dimensions of the output device, its periodic rate of refresh, bit-depth, number of colors and so forth.

Consider for example a browser window that contains an HTML document. In typical browser fashion, the document is shown as a single view onto a "bottom-less" document (called a "galley"). Obviously, an HTML document can grow to any length, while a window displayed on a video monitor cannot. Clearly there exists a relationship between logical length of the document and the physical size of the screen.

In modern GUI applications, logic is required to translate the logical-geometry of the document to the physical dimensions of the screen. Typically, a "view" abstraction is offered by the GUI that provides a "scrolibar" which allows the user to control the logical-to-physical mapping between models. This model works fine if a context is a graphical display—but consider what happens if there is to be a change to a printer context. Unlike graphical displays with scrollbars, a printer has a fixed width and height. A browser document no longer fits, and must be broken into "pages" for the printer. How the document is broken into pages is determined by the context model, layout and rendering delegates.

Each context-model within a document is associated with a logical-geometric frame model, a graphical-geometric facet model, is well as a one or more transformation matrices.

Also included in each context is a layout controller which manages the layout processes of geometric layout, and a rendering controller which manages graphimetric layout and drawing of graphical elements. Stated another way, imagine a single document model. That model gets mapped into frame-space by the layout process. Layout determines the size and relative placement of every piece of content in a document model. The frame-model created by layout gets mapped into a facet-model, which is later used to drive rendering. Note that since each context represents a device, each will have its own frame and facet models. And, in the present context, two or more contexts can map onto the same content model.

The facet model is responsible for interpreting the part model frames of a document in a graphical manner. Typically, the facet model relies upon the frame model for its interpretation of the part model, but this is not a requirement.

In the same way that part-content and frames are related via a layout delegate, frames and facets share a facet-delegate. A single frame can be reflected in the view system within any number of facets. There is a strong relationship between a facet and a frame; only an indirect relationship exists between a facet and a part.

The frame model essentially represents the part model of a document in logical-geometric space. This model is where layout processes work to "reflow" is content contained within the document part model. The frame model is abstracted (based on frames, delegates, and protocols) so that it can express arbitrarily complex layout geometric structures. As mentioned above, frames are just one of the types of objects that comprise the geometric model. Frames are constructed based on the stylistic interpretation of a given part. A frame is an arbitrarily complex geometric area which is produced in reference to a part. Typically this production is executed by delegates of the part in collaboration with the available style system. Frames are nested in logical-geometric space in relation the natural nesting of parts within a document model.

The style model in the layout engine represents all the stylistic attributes known to a system. The layout engine style model can be described as a rich set of protocols and abstract classes which represent style-based processes and style elements. Actual "styles" are represented by an extensible collection of low-order style elements. For example, style-atoms are used to compose a set of style molecules, which are themselves combined into style sheets. A collection of style sheets is called a style-set. Individual parts can provide their own style-molecules (built from style-atoms) which uniquely describe the parts.

Dynamically loaded HTML tags can provided new styles to a document by defining themselves as a unique collection of style-atoms.

In terms of key processes to affect the aforementioned structures, the following processes are important in rendering content. In particular, one of the highest order tasks of the layout process concerns the placement of the hierarchy of frames into logical-geometric space. An important aspect of this task is to resolve conflicts when frames contest for the same logical-geometric space.

It can be said that frame-layout and reflow are similar in nature, but work on different classes of layout elements. The reflow process is best thought of as a strategy in which a rich collection of layout-delegates collaborate to reflow part-content into frames. As content gets "reflowed", their frame containers may be required to resize themselves, which causes the logical-geometry management process to get invoked. It is important to note that the layout system itself contains code to manage the overall layout strategy; light-weight layout delegates plug into the layout-strategy in order to execute in the frame management and reflow processes.

The facet flow and layout process can be thought of as the graphical analog to the logical-geometric management process. Like frames, facets are geometric entities. However, unlike frames, facets do not (ordinarily) map directly back to content. Instead, facets refer back to frames in the logical-geometry system, and from there they can get to the content model. The facet layout process begins with a context, such as a printer or display. One aspect of this context is the geometric constraint of the visible view. Facet layout begins by determining which frames in the logical-geometry are "in view". Those frames are mapped onto one or more corresponding facets by a given facet-layout delegate.

Once the facet-geometry has been laid-out (see above), it can be rendered into the current context. The rendering process can be described as the strategy which accepts an arbitrary collection of facets and rendering delegates, and ultimately "renders" a graphical view of some or all of the document.

The aforementioned points concern the structures realized and abstractions confronted with regard to content layout wherein replaceable delegates may be used to process content retrieved via a network.

Now, attention is directed to how such structures interoperate together to provide a system to layout content. Recall that a document is created from a hierarchical collection of "parts". The top-most part in the hierarchy is called the root part; it lives within a "document shell". The layout engine automatically creates a document shell for each new root-part loaded into the environment. The document shell is a special object created and maintained by the layout engine. It's purpose is to serve as the command and event conduit between the run-time environment (such as a JFC view) and a "document". Application programmers can ordinarily ignore the shell, and presume that their documents are the topmost system element. When a part is first loaded into the layout engine, the system exercises the part handshaking API. This process allows the part to publish one or more style delegate objects to operate on its behalf. The "style-delegate" gets bound to the style manager. The style-delegate intrinsically understands the purpose of the part, and it understands stylistic aspects of the style system. The style-delegate will eventually be responsible for producing one or more layout-delegates on behalf of the part. The style delegate may also get asked to produce a rendering-delegate for the part.

A document is said to be created when a root-part is instantiated and inserted into a document shell. Along with the root part, the shell creates several other objects. First, it creates a Layout-Strategy object and a Rendering-Strategy object. The Layout-Strategy is responsible for the overall process of laying out and reflowing frames in logical-geometric space, and reflowing part content into frames. The Rendering-Strategy is responsible for the overall process of managing facets in graphical-geometric space and rendering part content into facets.

Moreover, the Layout-Strategy iterates the part model, asking the style-manager for a style-delegate that corresponds to the part in question. The style-manager compares the part identifier with registered style-delegates, and selects one most suitable. The layout-strategy then instructs the style-delegate to instantiate a layout-delegate hierarchy on behalf of the part. It is the layout-delegates which manufacture the part-frames which are then bound into the frame-model.

It is important to note that the layout-delegates are created on an as needed basis. They are usually singletons, so one need not worry about a proliferation of objects wreaking havoc on a garbage-collector routine.

As illustrated above, the Layout-Delegate passes each part to the style-manager, and requests a corresponding layout-delegate. The layout-delegate, in turn, is asked to create one or more frames based on a given part. Once this happens, all objects are in place: part, layout-delegate and frame.

Instances of Layout-delegates and frames are created on an as needed basis. Unlike layout-delegates, however, frames are not singletons. Each part in a hierarchy is reflected in one or more frames.

As soon as a valid frame is available (connected to a part and layout-delegate), the Layout-Strategy can begin the process of reflowing part contents into the frame hierarchy. The actual reflow process is hierarchical, beginning with the outermost frame. The frame is asked for its layout-delegate, and the layout-delegate reflow method is invoked. This process is hierarchical; each nested frame is queried for its layout-delegate in turn, and it is asked to reflow.

It is a conceptual convenience to distinguish the notion of layout separately from the notion of reflow. The notions are similar, yet retain a subtle difference. Layout typically involves the placement of frames within fixed frames in a rigid fashion. Reflow involves the streaming of "floating" frames (related to content) within fixed frames. The layout process therefore, begins with coarse elements (fixed elements on the page) and move successively to finer elements (text in a column).

Consider for a moment how a web page will get reflowed. Before it can pour content into columns, a page must layout its fixed elements: columns, headers, footers and so forth. Once these elements have been laid out, the page is free to pour its "floating" content, such as text, rules, tables and images. These in turn reflow their content.

Facet creation by the rendering-strategy (in the graphical realm) is very much like frame creation by the layout-strategy in the geometric world. The rendering-strategy iterates frames to determine which frames are at least partially in view. For each frame in view, the rendering-strategy determines the part, and asks the style-manager for a corresponding style-delegate. The style-delegate in turn is asked to manufacture a facet-delegate, which the rendering-strategy maintains. At last, the facet-delegate is asked to produce a facet on behalf of the frame.

Ultimately, rendering is the process of iterating facets, determining which are in view (and their relative order), and asking each to render itself into the current context.

The aforementioned structures illustrated in FIGS. 1–4 are configured to be controlled, processed and realized in a networked environment. Accordingly, reference is now made to FIG. 5. In particular, a network environment 500 includes an automatic data processing system such as a personal computing system 502, a server computer system 504, and the Internet 506 which are coupled to each other in conventional ways. Personal computing system 502 is configured to operate in accordance with client and application program software as illustrated in and described above with regard to FIGS. 1–4. More particularly, personal computing system 502 is configured to execute a layout engine program in accordance with the present invention that is further operative to receive replaceable software delegates from server computer system 504 which may be received via the Internet 506 or via some other network connection or otherwise (e.g., through local media such as a CD ROM, etc.). Server computer system 504 is configured as a web server system that is capable of serving content such as web pages and other content in accordance with a protocol such as the hypertext transfer protocol (HTTP). Such web server computer systems will be readily recognized by those skilled in the art.

Figure 5:
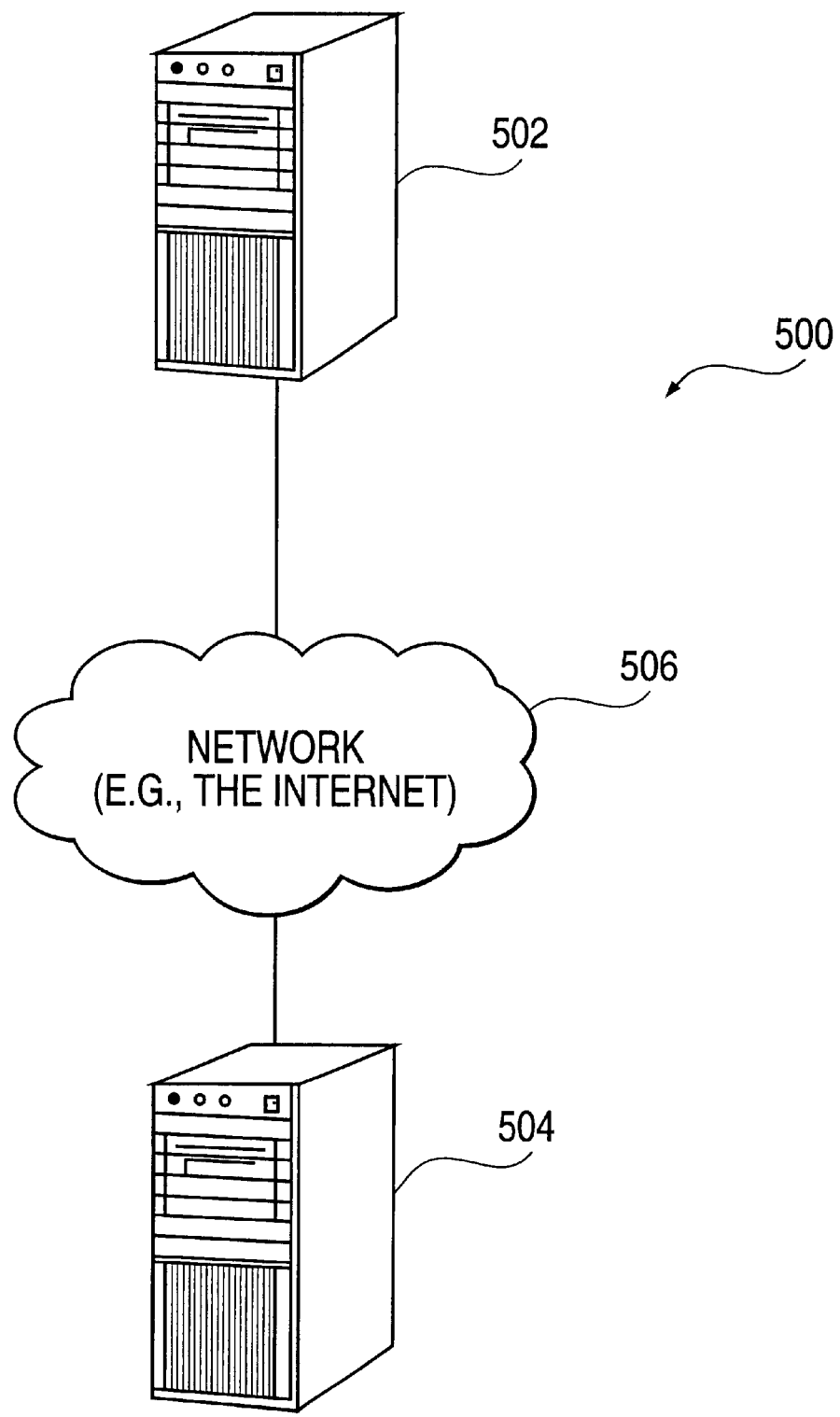
FIG. 5 is a block diagram that illustrates a client and a server computer which are coupled together via a network such as the Internet.
Figure 6:
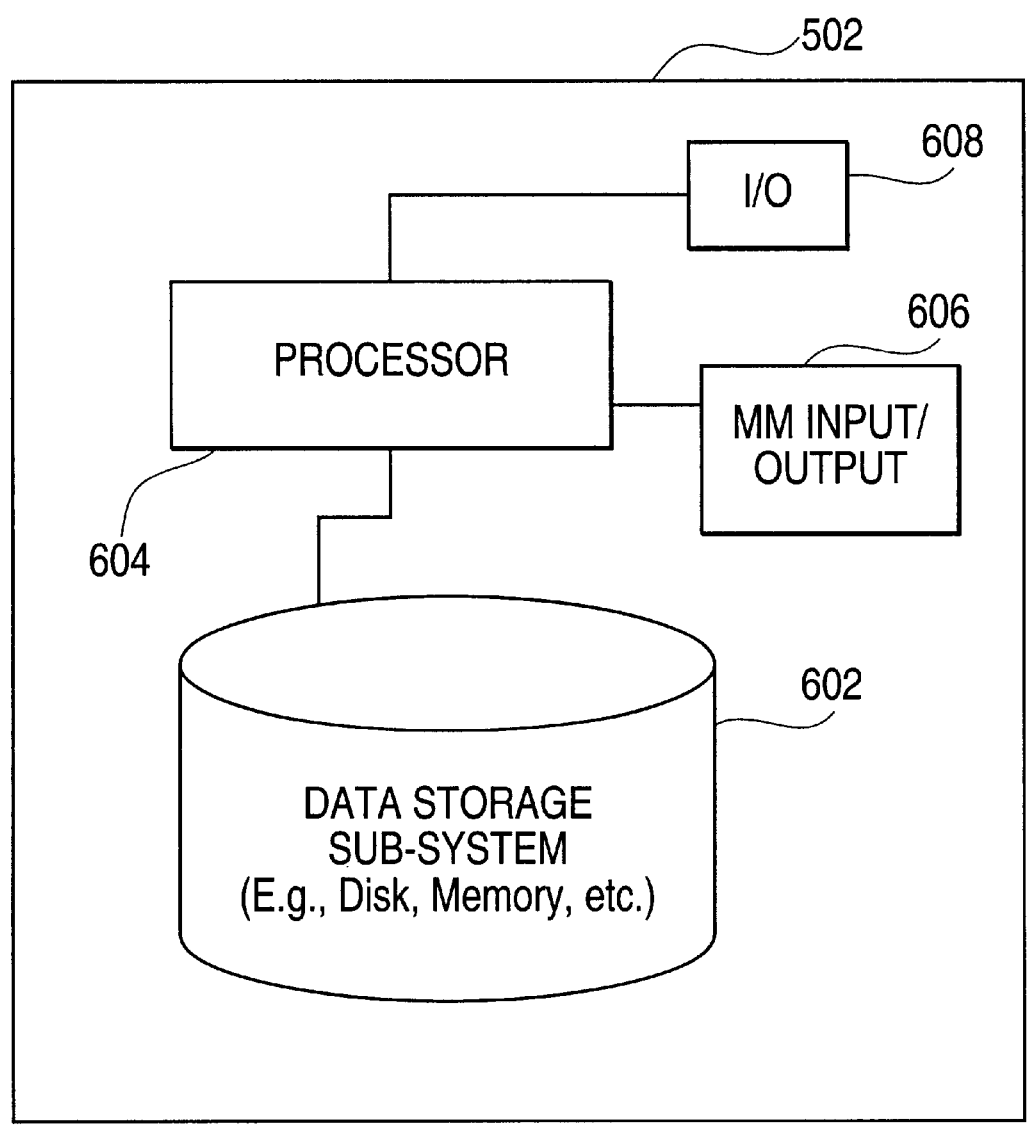
FIG. 6 is a block diagram of a client computer system which is configured to receive replaceable software delegates that may be used to process content received via the Internet according to a preferred embodiment of the present invention.

Referring now to FIG. 6, depicted therein is a further detailed block diagram of personal computing system 502 which is illustrated in FIG. 5. As noted above, personal computing system 502 is configured to receive replaceable software delegates that may be used to process content received via the Internet according to a preferred embodiment of the present invention. In terms of the structure of personal computing system 502, it includes a data storage device 602 and processor 604. Additionally, personal computing system 502 includes multimedia input/output facilities 606 such as CD ROM inputs, speakers, printers, etc., and input/output facilities 608 to allow personal computing system 502 to receive Internet and web content such as web pages containing HTML and other content, and replaceable software delegates. Such replaceable software delegates can be used by a layout engine (appropriate computer software) to control the way content received via the web is manifested and laid out within personal computing system 502. Such input/output facilities (e.g., a modem device, a network device, etc.) will be readily understood by those skilled in the art.

Operational Details

The structures depicted in FIGS. 1–6 are configured to operate together to provide manifestation and layout of content received via the Internet through use of distributed, replaceable software delegates within a web browser software environment. More particularly, such replaceable software delegates may be distributed from a web server computer system to a web client computer system (e.g., an automatic data processing such as a personal computing system) which are coupled via a network such as the Internet. The operations of such structures are illustrated in FIG. 7.

In particular, processing starts at Step S7-1 and immediately proceeds to Step S7-2. At Step S7-2, a browser software environment receives content from a web site (i.e., a serving computer system) such as via the Internet or via some other network. Alternatively, such content may be loaded into the browser software environment from a local source such as from local media. The content received may contain any form of content including, but not limited to, HTML, etc.

Next, processing proceeds to Step S7-3 where the browser software environment will determine if the content earlier received contains a part (e.g., an object) that includes a replaceable software delegate that may be used to enhance the functionality of the browser software environment and/or substitute existing functionality (i.e., executable code). If the determination is negative, processing proceeds to Step S7-7 which is described in detail below.

If, at Step S7-3, the determination is affirmative, processing proceeds to Step S7-4. At Step S7-4, the browser software environment will install the replaceable software delegate into itself during its runtime. Accordingly, the browser software environment will be dynamically enhanced/changed through inclusion of the functionality (e.g., layout and rendering functionality) of the replaceable software delegate received as a part of the content.

Next, processing proceeds to Step S7-5 where a determination will be made as to whether the replaceable software delegate was properly installed in the browser software environment. If that determination is negative, the content may be reloaded in a conventional way at Step S7-6 and processing may loop-back to Step S7-3.

It, at Step S7-5, the determination was affirmative, processing proceeds to Step S7-7 at the top of FIG. 7B.

At Step S7-7, the browser software environment will manifest (e.g., visually layout and render) the content earlier received (e.g., on a visual display device, etc.).

Processing ends at Step S7-8.

The process steps illustrated in FIGS. 7A and 7B which were described above may be modified in any fashion to suit particular software and operation requirements. The programming constructs and, in particular, any object-oriented programming constructs which are necessary to bring about the operations and resultant functionality depicted in FIGS. 7A and 7B will be readily understood by those skilled in the art of modern computer programming after reviewing the structural aspects of the present invention in conjunction with the processes described above.

Thus, having fully described the present invention by way of example with reference to the attached drawing figures, it will be readily appreciated that many changes and modifications may be made to the invention and to any of the exemplary embodiments shown and/or described herein without departing from the spirit or scope of the invention which is defined in the appended claims.

What is claimed is:

1. A system for manifesting content received via the Internet by an automatic data processing system, comprising:
    a content retrieval module for retrieving content from the Internet, said content arranged to be manifested by said automatic data processing system; and
    a content manifestation module coupled to said content retrieval module, said content manifestation module operable to receive a replaceable software delegate during operation of said content manifestation module, and to manifest said content within said automatic data processing system in accordance with said replaceable software delegate, said replaceable software delegate controlling the manifestation of said content by said content manifestation module.

2. The system according to claim 1, wherein said content is a web page that includes parts to be laid out by said content manifestation module through execution of said replaceable software delegate.

3. The system according to claim 1, wherein said replaceable software delegate replacing a corresponding and pre-existing software module, said corresponding and pre-existing software module normally controlling the manifestation of said content by said content manifestation module.

4. The system according to claim 1, wherein said content retrieval module and said content manifestation module are computer software objects that are executed within said automatic data processing system.

5. The system according to claim 1, wherein said content is manifested on a visual display device coupled to said automatic data processing system.

6. The system according to claim 1, wherein said replaceable software delegate is received by said content manifestation module via a network.

7. A computer readable medium containing instructions for controlling a computer system, said instructions for controlling said computer system comprising the steps of:
    retrieving content from the Internet, said content arranged to be manifested by said computer system;
    receiving a replaceable software delegate; and
    manifesting said content within said computer system in accordance with said replaceable software delegate said replaceable software delegate controlling the manifestation of said content by said computer system.

8. The computer readable medium according to claim 7, wherein said content is a web page that includes parts to be processed by said replaceable software delegate.

9. The computer readable medium according to claim 7, wherein said content is manifested on a visual display device coupled to said computer system.

10. The computer readable medium according to claim 7, wherein said replaceable software delegate is received via a network.

11. The computer readable medium according to claim 7, wherein said replaceable software delegate is received via the Internet.

12. A method for manifesting content received via the Internet comprising the steps of:
    retrieving content from the Internet, said content arranged to be manifested by an automatic data processing system;
    receiving a replaceable software delegate; and
    manifesting said content within said automatic data processing system in accordance with said replaceable software delegate, said replaceable software delegate controlling the manifestation of said content by said automatic data processing system.

13. The method according to claim 12, wherein said content is a web page that includes parts to be processed by said replaceable software delegate.

14. The method according to claim 12, wherein said content is manifested on a visual display device coupled to said computer system.

15. The method according to claim 12, wherein said replaceable software delegate is received via a network.

16. The method according to claim 12, wherein said replaceable software delegate is received via the Internet.

17. A system for manifesting content received via the Internet, comprising:
    a content manifestation device;
    a data storage device; and
    a processor coupled to said content manifestation device and to said data storage device, said processor operative to retrieve content from the Internet, to receive a replaceable software delegate, to store said replaceable software delegate in said data storage device, and to cause said content manifestation device to manifest said content in accordance with said replaceable software delegate, said replaceable software delegate controlling the manifestation of said content by said processor and said content manifestation device.

18. The system according to claim 17, wherein said content is a web page that includes parts to be laid out in accordance with the execution of said replaceable software delegate by said processor.

19. The system according to claim 17, wherein said replaceable software delegate replacing a corresponding and pre-existing software module, said corresponding and pre-existing software module normally controlling the manifestation of said content by said content manifestation device.

20. The system according to claim 17, wherein said content manifestation device is a visual display.

21. A system for distributing replaceable software delegates to automatic data processing systems in network environment, comprising:

a data storage device for storing a replaceable software delegate; and a processor coupled to said data storage device, said processor operative to distribute content to an automatic processing system coupled to said processor via network, said automatic data processing system configured to manifest said content, said processor further operative to distribute said replaceable software delegate to said automatic data processing system, said replaceable software delegate configured to control the manifestation of said content by said automatic data processing system.

22. The system according to claim 21, wherein said content is a web page including hyper text mark-up language (HTML) layout suggestions.

23. The system according to claim 21, wherein said content is a web page that includes parts to be laid out by a content manifestation device coupled to said automatic data processing system via execution of said replaceable software delegate.

24. The system according to claim 21, wherein said replaceable software delegate is intended to replace a corresponding and pre-existing software module residing within said automatic data processing system, said corresponding and pre-existing software module normally controlling the manifestation of said content by said automatic data processing system.

25. The system according to claim 21, wherein said network is the Internet.

26. The system according to claim 21, wherein said replaceable software delegate is contained within said content.

27. The system according to claim 21, wherein said content includes said replaceable software delegate.

28. A system for rendering content received via the Internet by an automatic data processing system, comprising:

a content retrieval module for retrieving content from a network, said content arranged to be rendered by said automatic data processing system; and a content rendering module coupled to said content retrieval module, said content rendering module operable to receive a replaceable software delegate during operation of said content rendering module, and to render said content within said automatic data processing system in accordance with said replaceable software delegate, said replaceable software delegate controlling the rendition of said content by said content rendering module.

29. The system according to claim 28, wherein said content is a web page that includes parts to be rendered by said content manifestation module through execution of said replaceable software delegate.

30. The system according to claim 28, wherein said replaceable software delegate is intended to replace a corresponding and pre-existing software module, said corresponding and pre-existing software module normally controlling the rendition of said content by said content rendering module.

31. The system according to claim 28, wherein said content retrieval module and said content rendering module are computer software objects that are executed within said automatic data processing system.

32. The system according to claim 28, wherein said content is manifested on a visual display device that is coupled to said automatic data processing system.

33. The system according to claim 28, wherein said replaceable software delegate is received by said content rendering module via a network.

34. The system according to claim 28, wherein said replaceable software delegate is received by said content rendering module via the Internet.

35. The system according to claim 28, wherein said replaceable software delegate is encapsulated within said content.

* * * * *